May 25, 1965 M. D. SPITSBERGEN ETAL 3,185,080

HAMMER MAGNET GATE SYSTEM IN HIGH SPEED PRINTERS USING TRANSISTOR CIRCUITS

Filed Sept. 25, 1961 11 Sheets-Sheet 1

INVENTORS
MERLIN D. SPITSBERGEN
HARRISON I. CRAIG
BY Whittemore Hulbert & Belknap
ATTORNEY May 25, 1965 M. D. SPITSBERGEN ETAL 3,185,080

HAMMER MAGNET GATE SYSTEM IN HIGH SPEED PRINTERS
USING TRANSISTOR CIRCUITS

Filed Sept. 25, 1961 11 Sheets-Sheet 2

May 25, 1965 M. D. SPITSBERGEN ETAL 3,185,080

HAMMER MAGNET GATE SYSTEM IN HIGH SPEED PRINTERS
USING TRANSISTOR CIRCUITS

Filed Sept. 25, 1961 11 Sheets-Sheet 8

May 25, 1965 M. D. SPITSBERGEN ETAL 3,185,080

HAMMER MAGNET GATE SYSTEM IN HIGH SPEED PRINTERS USING TRANSISTOR CIRCUITS

Filed Sept. 25, 1961 11 Sheets-Sheet 11

United States Patent Office 3,185,080
Patented May 25, 1965

3,185,080

HAMMER MAGNET GATE SYSTEM IN HIGH SPEED PRINTERS USING TRANSISTOR CIRCUITS

Merlin D. Spitsbergen, Rochester, and Harrison I. Craig, Detroit, Mich., assignors, by mesne assignments, to Control Data Corporation, Minneapolis, Minn., a corporation of Minnesota Filed Sept. 25, 1961, Ser. No. 140,613
19 Claims. (Cl. 101—93)

This invention relates to printers for use with electronic computers, and particularly to a novel electromechanical, so-called "on-the-fly" type printer. More specifically, this invention relates to the hammer magnet gate system for preparing semi-conductor circuits associated with selected print hammer addresses of the printer for actuation in accordance with signals fed to the printer by the computer.

Very briefly, a printer embodying the invention includes a continuously rotated print drum having characters spaced radially around the drum in horizontal rows of identical characters to be printed. Printing takes place by causing hammers to drive the paper into the characters on the drum.

The printer disclosed herein may be used in conjunction with a computer-buffer combination as a medium and/or high speed data processing system. For example, the particular embodiment of the printer disclosed herein is capable of printing 120 character lines at a rate of 150 lines per minute, and under special circumstances at a rate of 600 lines per minute for all numeric characters. The computer derives the necessary information and places it on its output terminals in such a way that it is fed into the printer one line at a time. After the computer has completed the derivation of one line of information, it then derives the vertical format or number of lines which the computer desires to skip on a printed sheet before it prints the next line. This information is also fed out onto the computer output lines and used by the printer.

Before stating some of the specific objects of the invention and describing the construction and operation of the printer in detail, it seems desirable to present a general discussion thereof for purposes of orientation. In this connection, the assumption will be made that the computer with which this printer is employed sorts its information in terms of character bins. In other words, as the computer looks at information in its arithmetic register system, it determines two things about a particular character of information. First, it determines what character it wishes to print; second, it determines at what address or hammer number from 1 to 120 it wishes to print this character. A portion of the memory in this printer has been designated for the addresses of each character. Since this particular embodiment of the printer is designed to print no more than 120 characters on any given line, 120 positions in memory have been assigned for addresses of each character, either alphanumeric, which it is desired to print.

After the computer has processed the information which it wishes to print and has placed all addresses in their appropriate character bins, the computer is then prepared to output this information to the printer-buffer combination. When the computer is in its print mode of operation, it receives information from the printer telling it which character the printer is capable of printing. The computer then sorts through the appropriate bin, locating the addresses of all positions which the computer desires to print. These addresses are fed in sequence through the buffer, amplified and impedance matched by the buffer and then fed to the input register of the printer. The printer input register decodes the computer signals and pulses appropriate hammer magnets, causing the selected hammers in the printer to be triggered and dropped into a print cam so as to print the character.

After the computer has determined that one complete line of information has been sent to the printer, it then determines the vertical format or number of lines to be skipped on the printed form before the next line is printed. This skip information is then placed on the output lines of the computer, reduced by the buffer, and subsequently fed into the input register of the printer. At the end of the paper skip period, the printer feeds an input request signal back to the computer telling the computer that it is ready to print the next line of information. The computer then reduces the next line of information, repeats the previous sequence of accepting characters to be printed from the printer, and places the addresses of these characters on the output lines of the computer to be fed into the input register of the printer.

In most instances, a computer such as that presently under discussion for orientation purposes will be connected through its input-output lines to several pieces of equipment in addition to the printer. This other equipment may be tape readers, card readers, tape punches, or perhaps another computer. As the computer attempts to communicate with any one of the several units of such peripheral equipment attached to it, there is the possibility of causing malfunction in one of the other pieces of equipment. Steps must therefore be taken to insure that only the selected piece of equipment is able to send or receive information. Thus, the buffer referred to above is placed between the computer and the printer to insure that no information is received from the printer and that no information is fed into the printer input register, except at times when the printer has been selected by the computer as an output device. The buffer accomplishes this function by controlling the gating of both the computer input to the address register and the printer output from the character generator. The buffer detects the printer select code from the computer and uses this code to enable or inhibit the gates in the buffer system. In addition to accomplishing the gating function, the buffer also serves as an impedance matching device between the output of the computer and the input to the printer, and between the output of the printer and the input of the computer.

The printer is designed to be a general purpose device that can adapt itself to most types of computers. However, cases occur where the printer cannot directly use either the wave shapes or the voltage levels which may be placed on the computer output line. In these cases, pulse forming and gating networks in the buffer are used to re-shape the pulses. Specific illustrations are the strobe line, which must be delayed from the computer information ready line, and the paper advance command, which is derived from the computer paper advance command but is re-shaped. The printer input register reset command is also derived in the buffer from computer output.

As will be seen from the subsequent detailed description, the specific printer disclosed herein involves the use of certain magnets associated with each print hammer, and a basic objective in the design of this printer is to energize the correct print magnets at the proper time to enable the selected hammers to fall into a print cam and be driven against the proper character on the print drum. The selection of one of the 120 print magnets is accomplished by the computer input decoding system, which uses the address placed on the input lines by the computer to set a group of input flip-flops, seven in this particular printer design. These seven printer input flip-flops are used in conjunction with a double level gating system to define one of 120 unique print positions. When the seven computer input lines define one print magnet, this input signal causes a circuit, for example a print magnet thyristor, to be turned on through a resistor. Turning on the thyristor allows selection of the proper print magnet.

Synchronization between release time of the print hammer associated with the triggered print magnet and a mechanical print cam is accomplished through use of a variable reluctance magnetic pickup. This magnetic pickup senses the position of the lobes formed on the print cam and is used to trigger the printer control timer. The printer control timer is an interrelated group of one-shot multivibrators that determines the length of each portion of one print cycle. A print cycle is defined as the time required for succeeding rows of identical characters on the print drum to pass a fixed line, such as the line of print hammers; in the particular printer disclosed, it covers a period of 6.25 milliseconds.

The above print cycle is itself divided into three different times referred to herein as the reset time, the read time, and the type command time. More specifically, the reset time is a priod of one-half millisecond following detection of a lobe on the print cam; during this period, the thyristors, which control the 120 print magnets and have been previously energized, are simultaneously turned off or put at zero position During the next two milliseconds, the read time, a printer input request signal is generated by the control timer. This printer input request signal is processed through the buffer and fed into the computer, telling the computer, so to speak, that during these two milliseconds, time is available to feed the addresses of particular characters into the printer. The computer then scans the printer character generator for the character on the print drum approaching the print hammer positions and places the addresses of all positions for this character in storage on the computer output lines. During this two millisecond printer input request or read time, all thyristors at hammer positions called for by the computer are thus energized.

The following 3.75 milliseconds of the print cycle, the type command time, are taken up by the print magnet power period or type command. During this time, a high current pulse is gated to all hammer magnets whose thyristors have previously been selected. At the end of the 3.75 millisecond type command period, all hammers requested by the computer will have been positioned for actuation by interposer linkages in the path of the print cam. The next cam lobe is then sensed by the magnetic pickup, and a new reset signal is generated to turn off all thyristors in the unit, after which the hammers and interposer linkages are restored to their rest positions.

Inasmuch as the print drum is continuously rotated at a relatively high speed and a line of print is completed on a single revolution of the print drum, it is apparent that the print hammer mechanism must necessarily be capable of extremely rapid operation. At the same time, however, the hammer mechanism must give printing of uuiform intensity and spacing, be relatively easy to assemble and repair and be dependable in operation.

From the above general discussion of the printer, it is apparent that one of the objects of the invention is to provide a printer for use with electronic computers or the like having an improved hammer gate system.

Another object is to provide a gate system for printer hammers or similar structures including receiving means for signals representative of particular addresses, means for selecting the particular addresses represented by the received signals and means for preparing a circuit at the selected addresses for subsequent operation.

Another object is to provide a gate system as set forth above wherein the means for receiving signals representative of particular addresses includes a plurality of flip-flops connected to receiving the signals representative of particular addresses on one side and to alternately receive a reset signal on the other side thereof which flip-flops are divided into groups for feeding different levels of the means for selecting the particular addresses represented by the signals received by the flip-flops.

Another object is to provide a gate system as set forth above including a plurality of AND gates and a plurality of OR gates each connected to a different group of the signal receiving flip-flops wherein a different AND and OR gate output are connected together and to a circuit at each possible address to provide double level gating uniquely defining a plurality of different addresses with a minimum number of components and requiring a minimum amount of power for operation.

Another object is to provide a gate system as set forth above including means for feeding a print command signal to each of the AND gates after the signals on the input flip-flops have become stable to initiate utilization of the signals in preparing the circuit at the selected addresses for subsequent operation.

Another object is to provide a gate system as set forth above wherein the circuit at the selected addresses includes a thyristor or the like, the base of which is capacitively connected to the output of each AND and OR combination through a diode.

Another object is to provide a gate system as set forth above wherein the circuit at the selected addresses further includes a resistor connected to the collector of a thyristor through which a reset signal is fed to the thyristor cyclically, and a pulse coil also connected to the thyristor collector through a diode through which the transistor is periodically caused to conduct heavily.

Another object is to provide a printer hammer gate system for actuating selected printer hammers during each cycle of operation of a printer which gate system has minimum voltage and power requirements.

Another object is to provide a printer hammer gate system which is simple in construction, economical to manufacture and efficient in use.

These and other objects and advantages of the invention will become apparent by reference to the following specification and the accompanying drawings, wherein.

Figure 1:
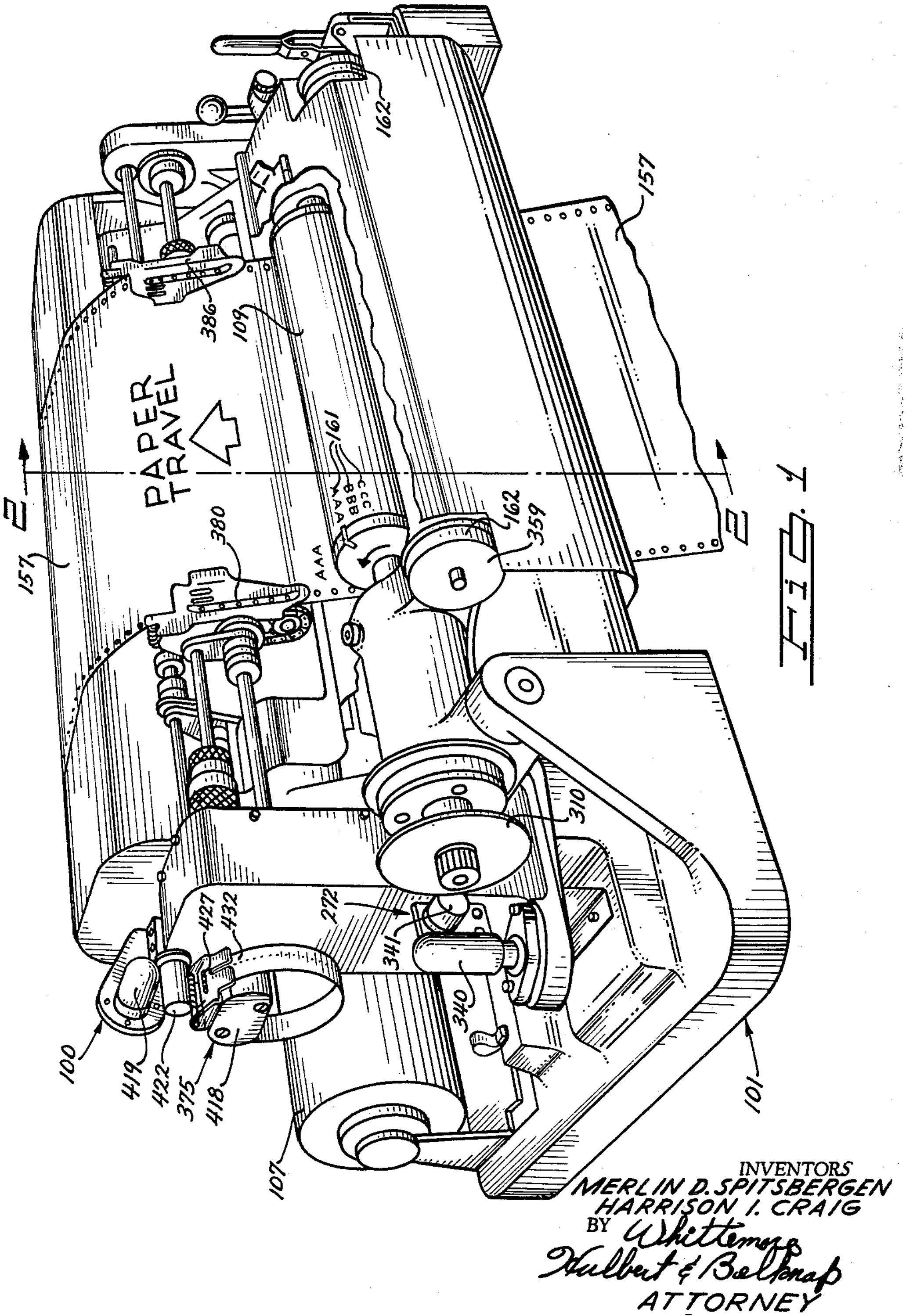
FIGURE 1 is a perspective view of a printer embodying the invention.

Referring now to the drawings in greater detail, a complete printer 100 embodying the invention is generally comprised of three main portions: a mechanical portion, a power supply portion and an electronics portion, the latter portion cooperating with a computer-buffer combination in supplying the various electronic control signals briefly referred to above and necessary for proper operation of the printer.

The invention claimed herein does not necessarily require an understanding of the specific details of the mechanical portion of the printer, and therefore they are omitted. For additional background information a detailed disclosure of the entire printer 100 is found in U.S. application Serial No. 138,157.

As explained more fully in the above application, printer 100 (FIGURES 1 and 2) is "on-the-fly" line printer using a rotary print drum 109 driven by motor 107 through an appropriate power train (not shown). The motor, print drum and other mechanical components of the printer are suitably supported on or by main frame 101.

The paper 157 is moved in the direction of the arrow (FIGURE 1) through a printing station (FIGURE 2) located between transversely movable ribbon 162 and the faces 181 of a row of print hammers 160. Ribbon 162 is an ordinary typewriter ribbon driven from spools 359 in a direction parallel to the axis of drum 160. Selected hammers 160 are driven against paper 157 in the print station to impact the paper against the ribbon and the ribbon against the confronting raised characters 161 on drum 160. The selection of hammers and the timing thereof form a part of the invention, and these features are described in more detail later.

Figure 2:
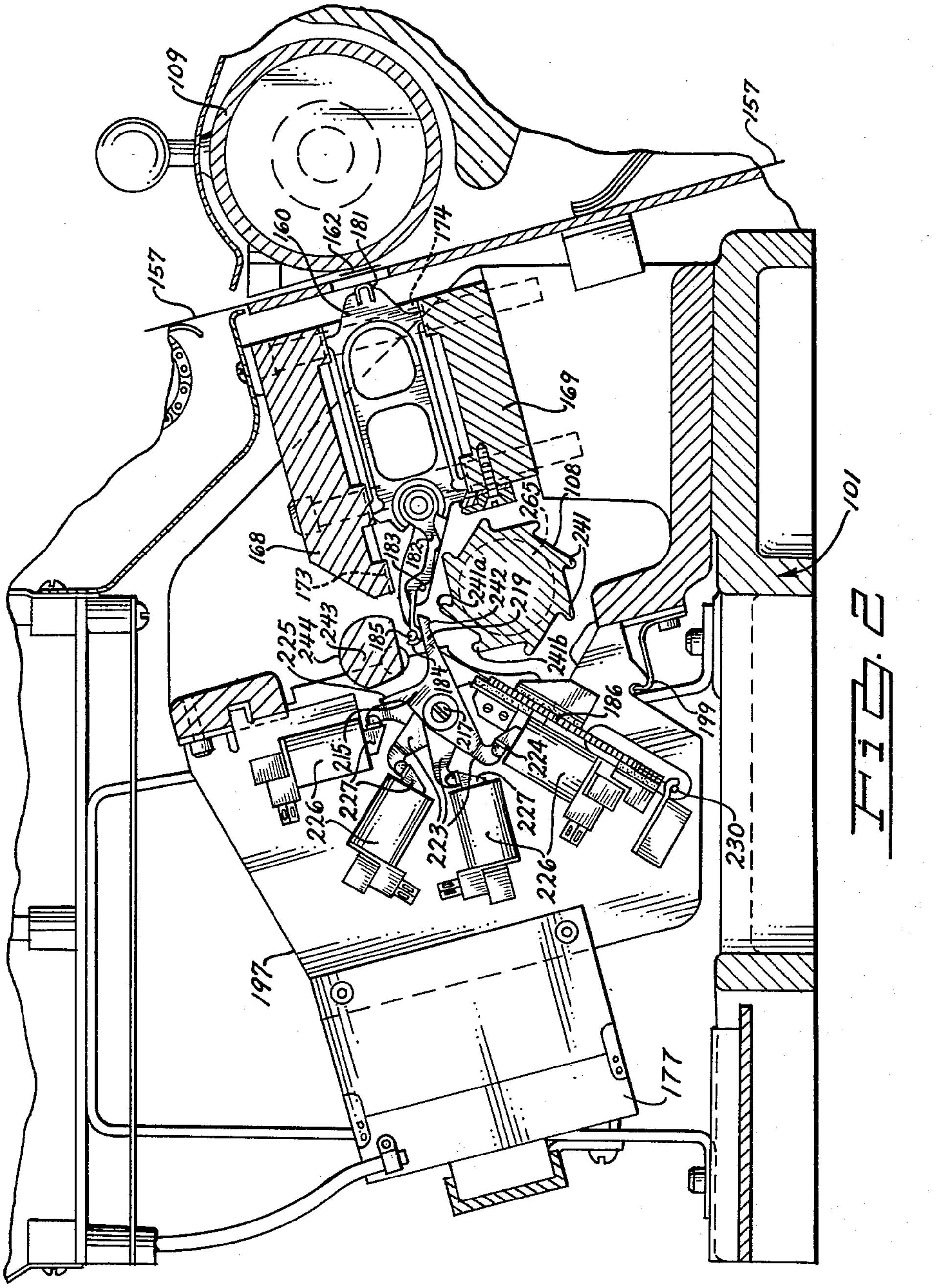
FIGURE 2 is a cross-sectional view, with portions thereof cut away, taken on the plane of line 2—2 of FIGURE 1 and looking in the direction of the arrows.
Figures 9, 14, 15:
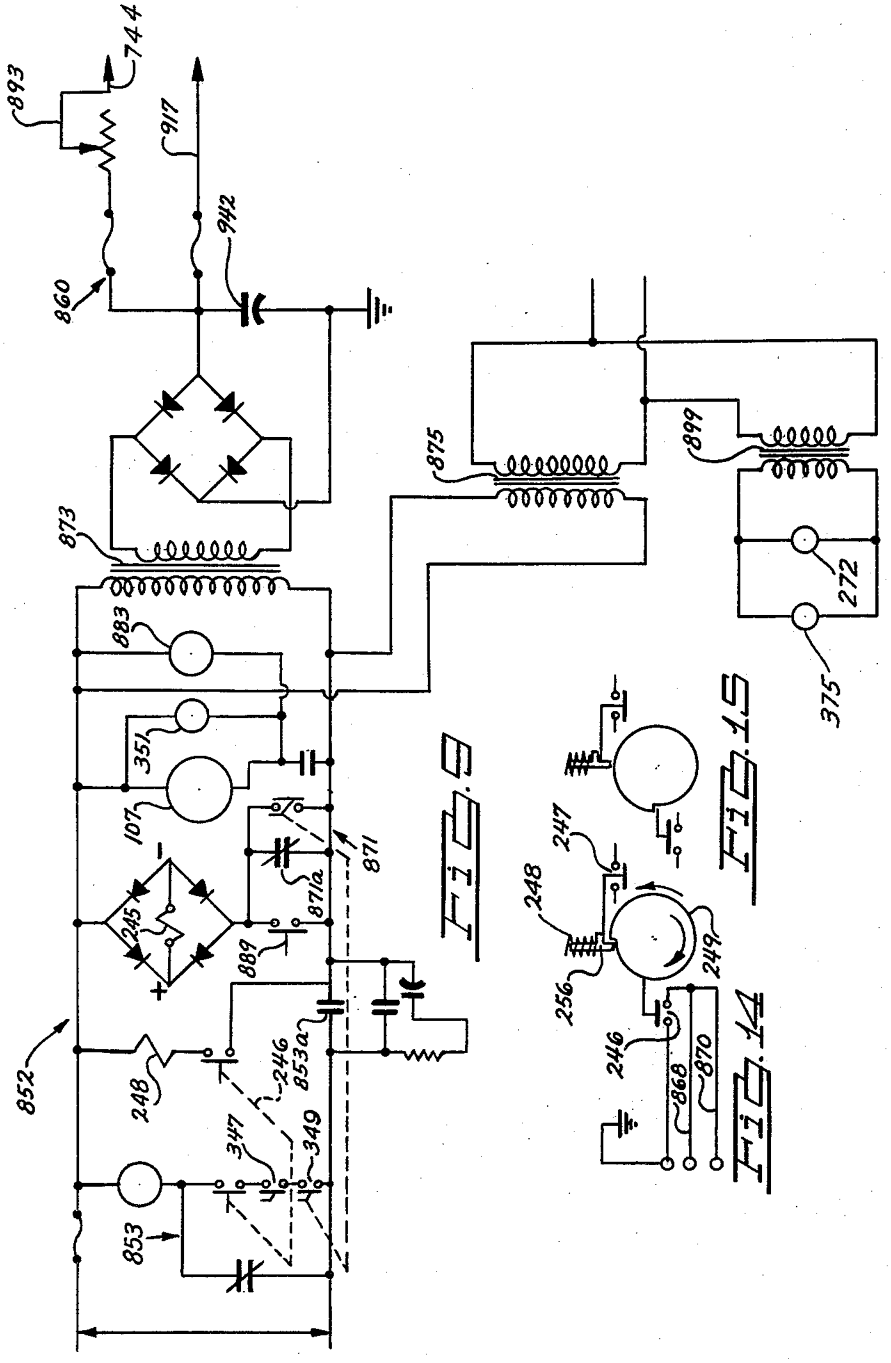
FIGURES 9 and 10 are schematic diagrams which in conjunction with the voltage sensing circuit illustrated schematically in FIGURE 11, the cycle check circuit illustrated schematically in FIGURE 12, and the low voltage checking circuit illustrated schematically in FIGURE 13, illustrate the control circuit of the printer.
FIGURES 14 and 15 illustrate diagrammatically the bail bar of the printer and the associated latch portion of the printer control circuit in the two static positions of the bail bar.

Each print hammer 160 (there being one hammer for each character 161 of a single row) is constrained to linear motion by being mounted in ways 173 and 174 in a mounting block assembly 168, 169 attached to a module plate 197. The plate is separably secured to frame 101, as by latches 177 and 199, and each plate can support one or more hammers. The hammers are driven by the lobes 241 of cam 108, the latter being synchronized with drum 109. Specifically, each hammer has an interposer linkage which is either presented to a cam lobe 241 to drive the hammer, or the linkage is not presented to (held spaced from) the lobe, in which case the hammer is not driven against the paper 157. As shown in FIGURE 2 each linkage consists of an interposer lever 182 pivoted to the inner end of its hammer. Surface 183 of lever 182 is the impact surface for cam 108. Hook 184 of lever 183 retains end 185 of tension spring 186, and the other end 230 of the spring is anchored to plate 197. Lever 215 is pivoted as at 217, to plate 197 and forms a part of the interposer linkage for the illustrated hammer 160 (FIGURE 2). The first arm 219 of lever 215 contacts the lower surface of lever 182. Second arm 223 of lever 215 has a magnetic armature 224 for use with an electromagnet 226 (described later) and third arm 225 used with bail bar 243. The bail bar is cam shaped (FIGURE 2) and is rotationally movable to one of two positions by a rotary solenoid 245 (FIGURE 9). In one bail bar position (FIGURE 2) the interposer linkages are free to move, and when bail bar 243 is rotated approximately 45°, the surface 244 thereof locks the interposer levers by engaging the arms 225 thereof.

Each electromagnet 226 has two windings 228 and 229 (FIGURE 6) the former being a holding coil and the latter being a pulse coil. Holding coil 228 is continually energized thereby holding the armature 224 against the pole piece of the electromagnet. When the hammer is addressed for printing, coil 229 is energized (pulsed) to cancel the holding force and allow spring 186 to pull the interposer linkage downward, thereby placing surface 183 in the path of a cam lobe 241*a*. This enables the lobe to drive the lever 182 and its hammer 160 toward the printing drum 109. After hammer impact, lobe 241*b* contacts surface 242 of arm 215 and resets the interposer linkage to the position shown in FIGURE 2.

Figure 8:
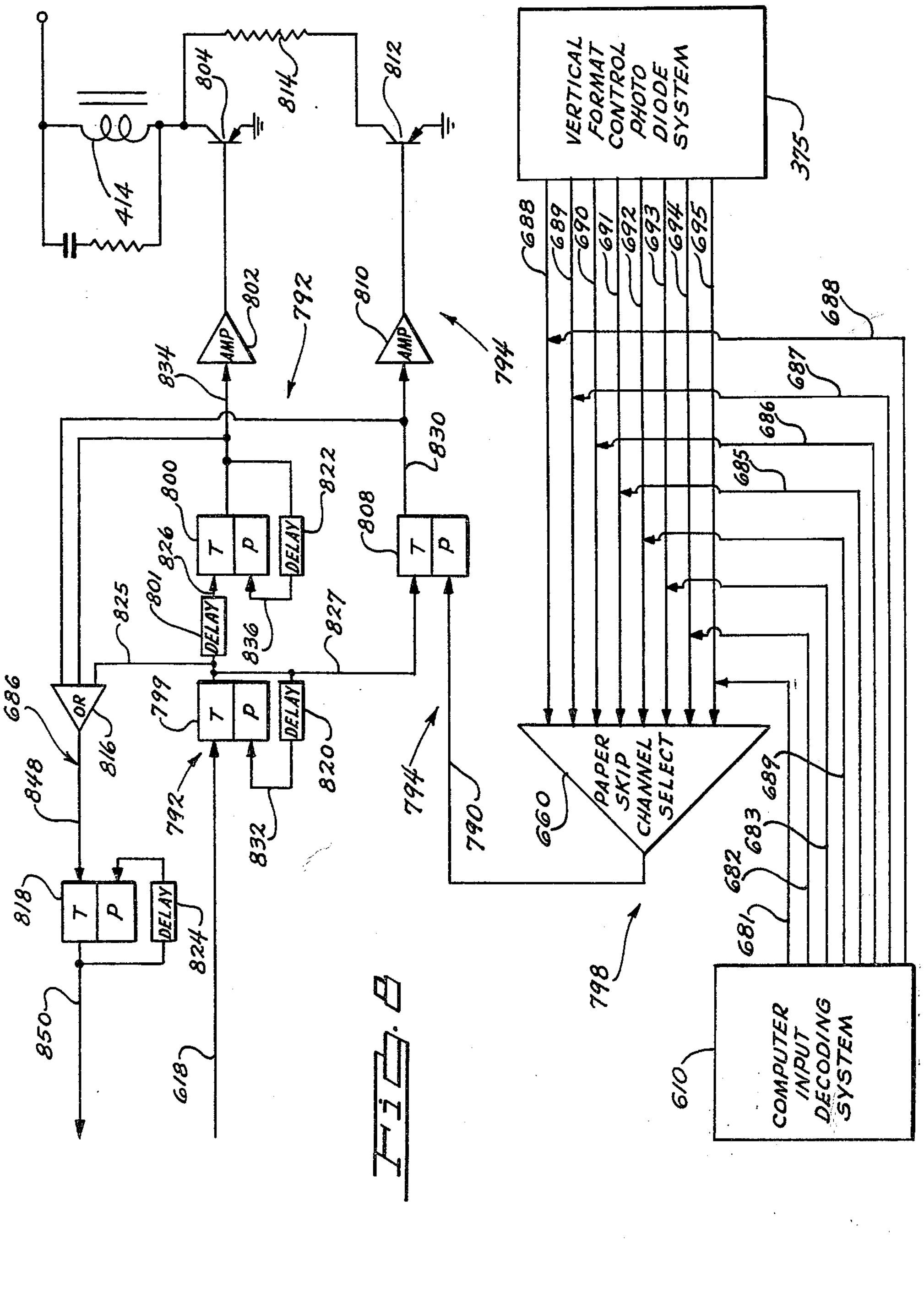
FIGURE 8 is a partly block and partly schematic diagram illustrating the paper motion spring clutch control system of the electronic portion of the printer.

It is apparent that drum 109 and cam 108 can be mechanically synchronized. However, instantaneous positional information of the cam lobes 241 is required. A magnetic timing disk 265 rotatable with cam 108 and a stationary magnetic pickup 269 (FIGURE 5) is used for this purpose. Print drum character generator system 272 (FIGURES 1 and 5) provides signals identifying which row of characters can next be printed, i.e. the location of characters while drum 109 rotates. This can be an optical code disk 310 driven with drum 109, and a photoelectric (e.g. photodiode) scanner represented by lamps 340 and lens 341 in FIGURE 1. Also, the motion of paper 157 is synchronized with the hammer-motion cycles. For this purpose the paper tractors 380 and 386 are driven by a spring clutch 128 (FIGURE 5) under the control of solenoid 414 (FIGURE 8). A photoelectric format control 375 is also driven by the spring clutch, the purpose of the format control being to control the number of print-line spaces which the tractors advance the paper between print cycles. The format control can be conventional and is represented by paper tape 432, photocell box 418, photocells 427, lamp 419 and lens 422.

*Electronic portion*

Figure 6:
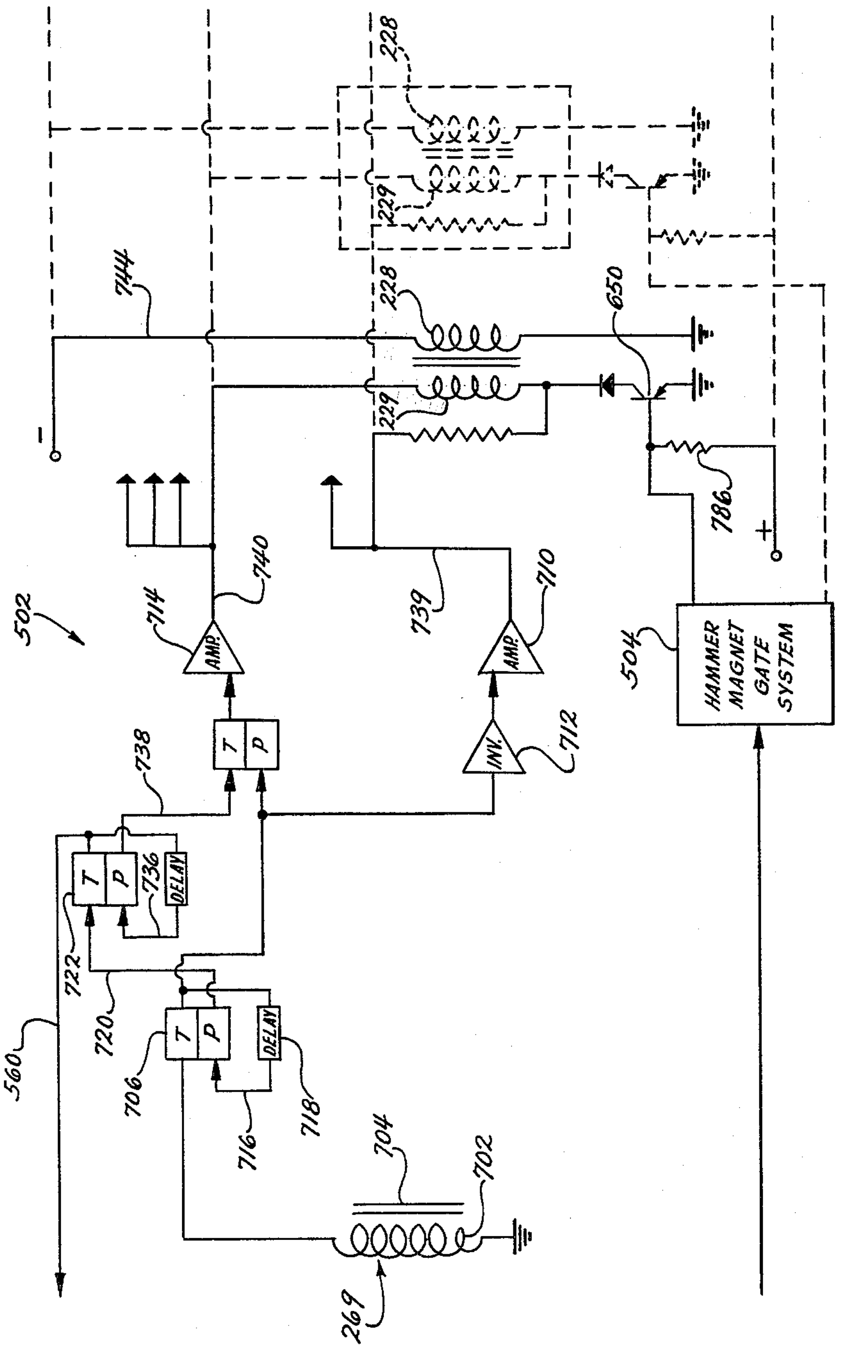
FIGURE 6 is a partly block and partly schematic diagram illustrating the hammer magnet control system of the electronic portion of the printer.
Figure 7:
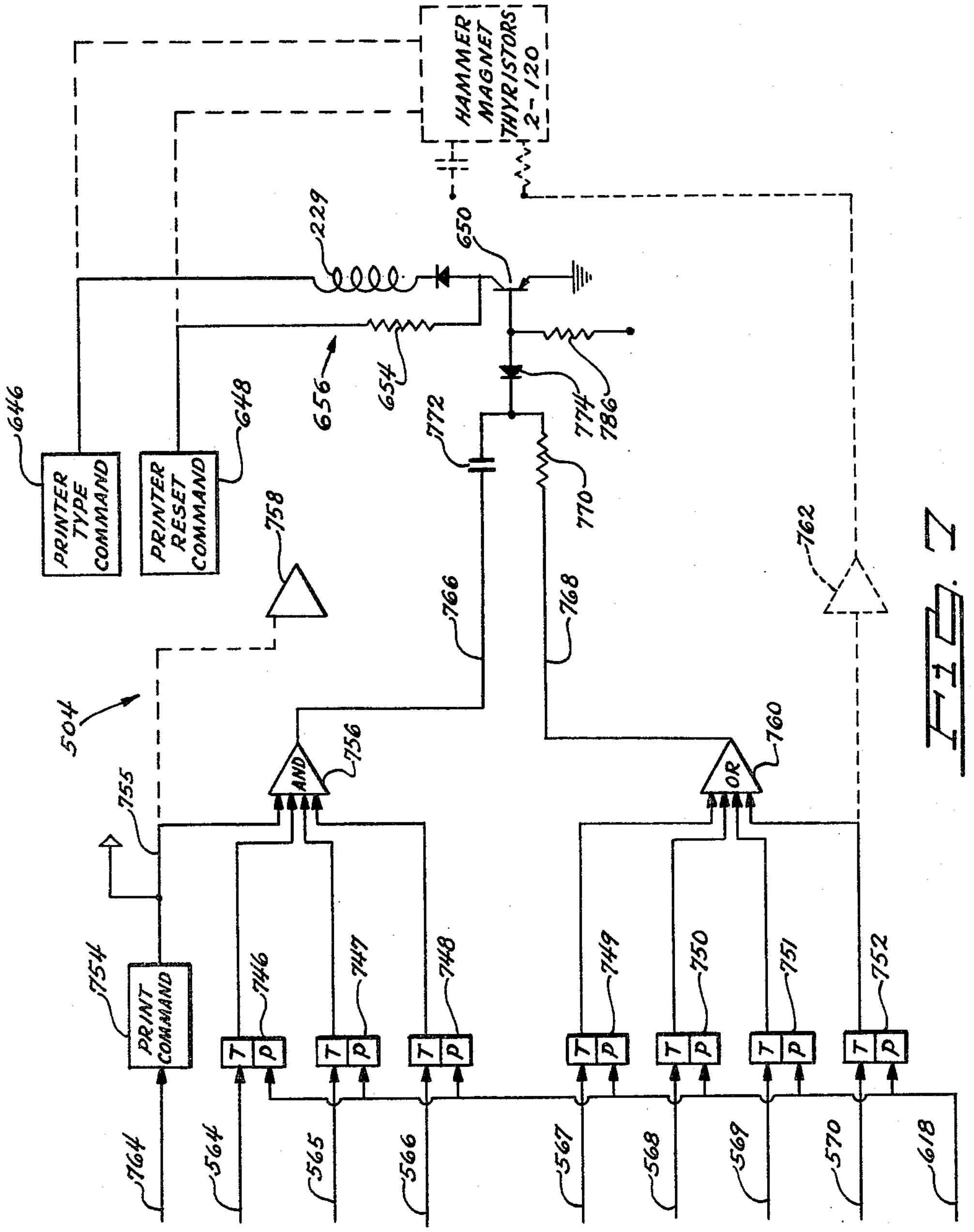
FIGURE 7 is a partly block and partly schematic diagram illustrating the hammer magnet gate system of the electronic portion of the printer.

The electronic portion 500 of the printer includes a hammer control system 502, a hammer gate system 504 and a paper motion spring clutch control system 506. The hammer control system 502 illustrated in FIGURE 6 is provided to synchronize the operation of the electronic portion of the printer with the mechanical portion thereof and to sequence the operation of the electronic portion of the printer. The hammer gate system 504 illustrated in FIGURE 7 is provided to prepare the selected printer hammers for actuation in accordance with signals fed to the printer by the computer 508. The paper motion spring clutch control system 506 illustrated in FIGURE 8 is provided to control the advance of paper through the printer in accordance with a predetermined format and to inhibit the input of information to be printed to the printer during paper advance.

Figure 3:
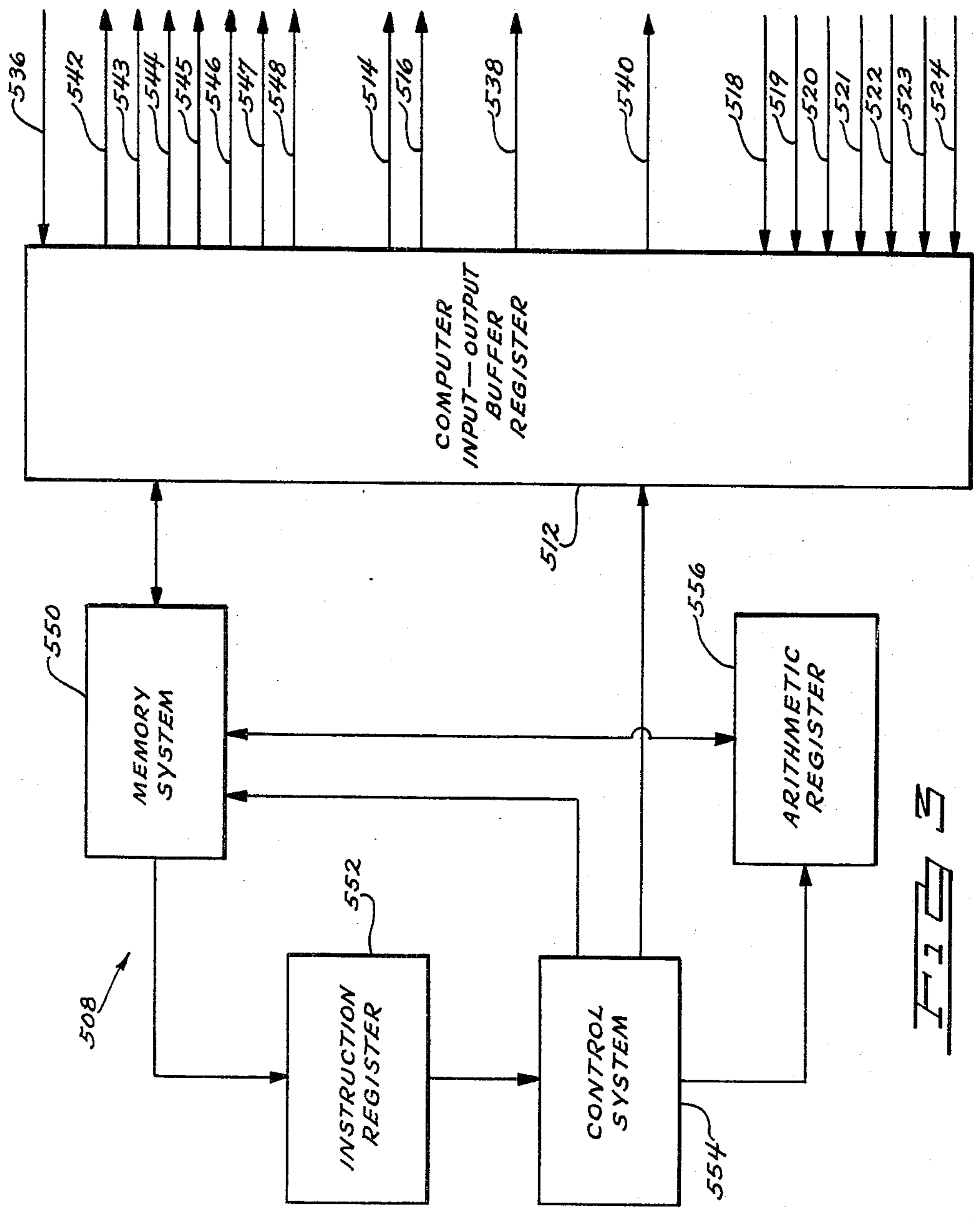
FIGURE 3 is a block diagram illustrating a representative computer with which the printer may be used.
Figure 4:
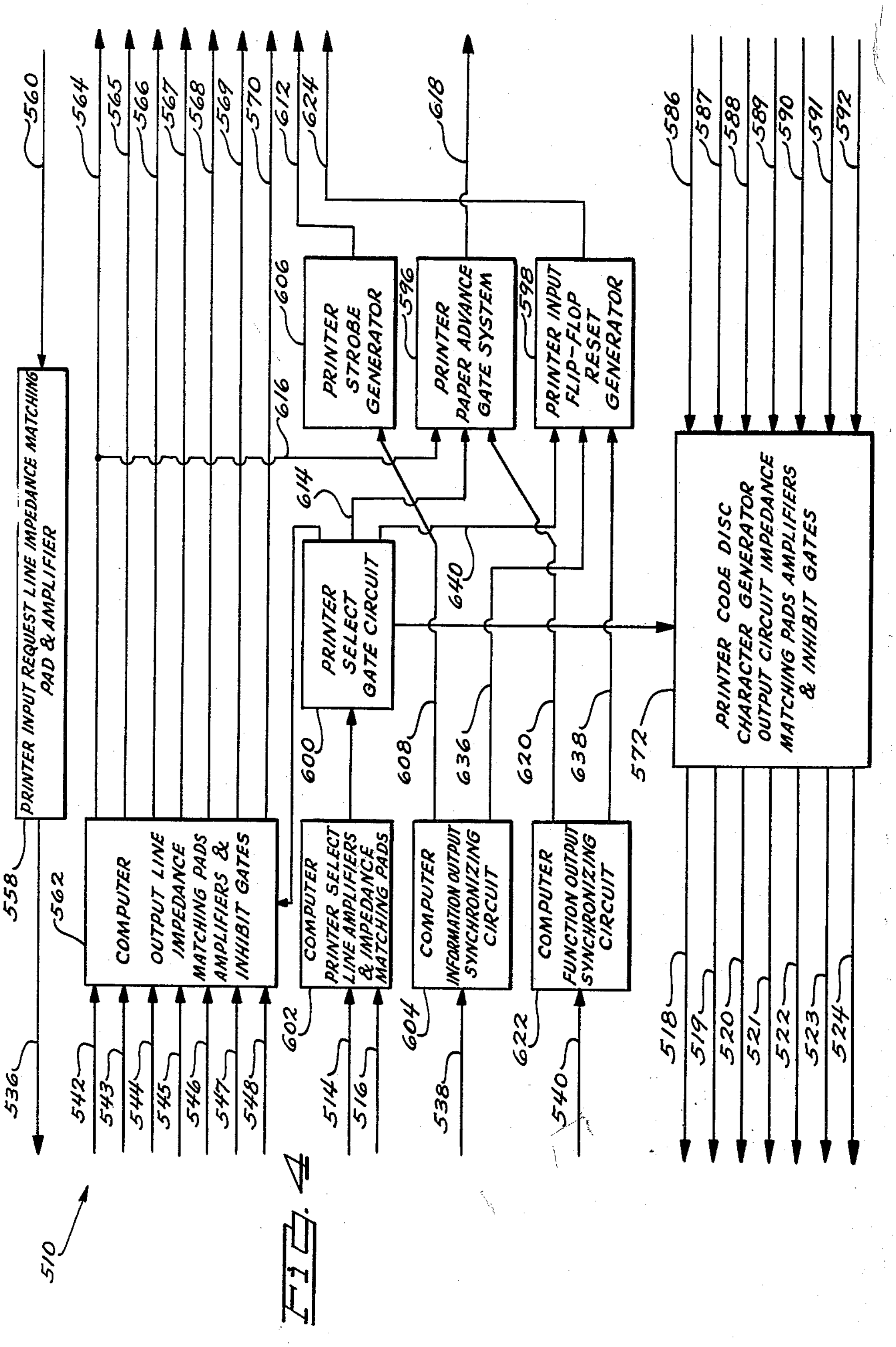
FIGURE 4 is a block diagram illustrating a representative buffer which may be used between the computer illustrated in FIGURE 3 and the printer.
Figure 5:
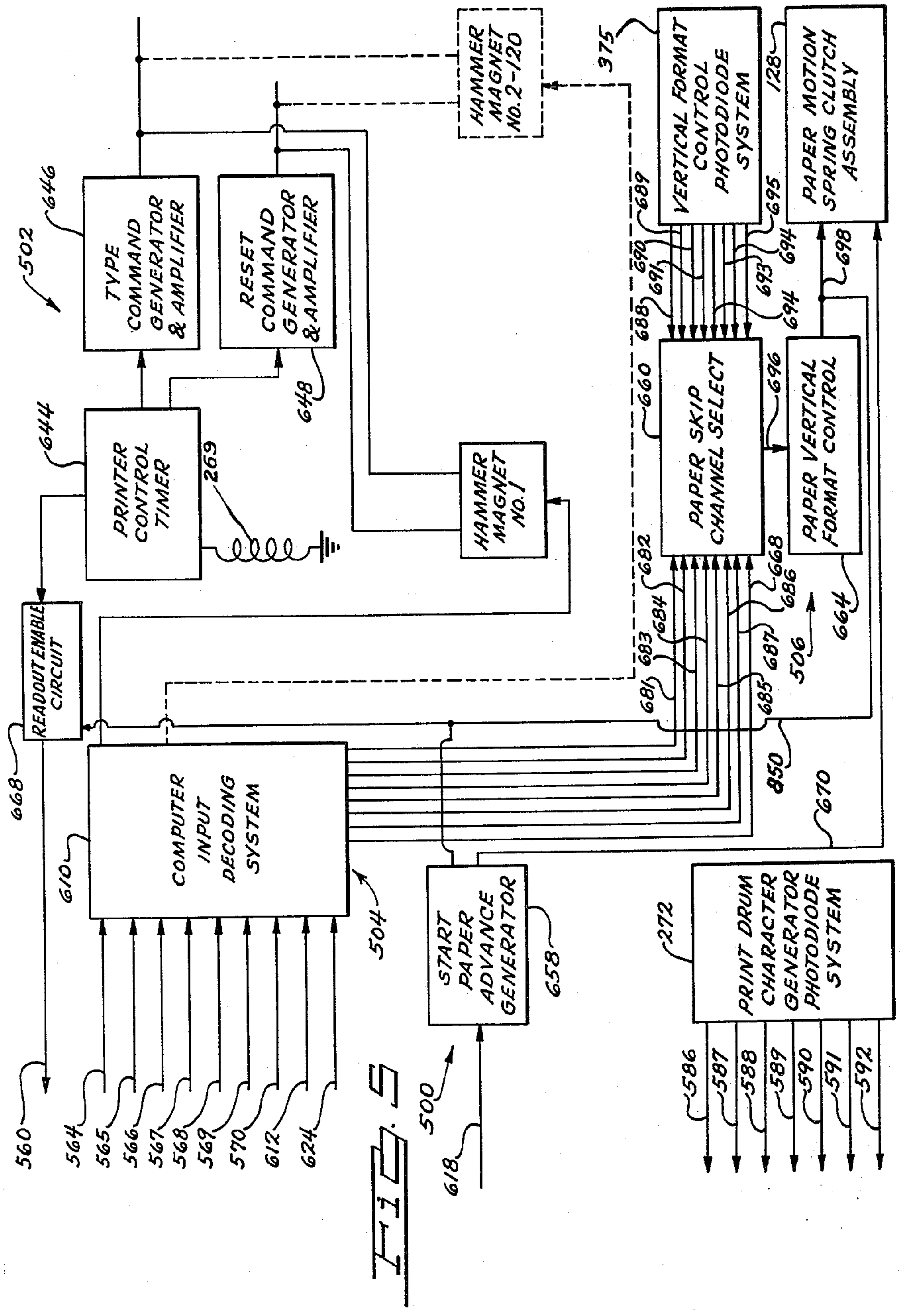
FIGURE 5 is a block diagram illustrating the electronic portion of the printer.

The electronic portion 500 of the printer including the hammer control system 502, hammer gate system 504 and paper motion spring clutch control system 506 shown in block diagram in FIGURE 5 will be considered in detail after briefly considering the relation thereof to the computer 508 shown in block diagram in FIGURE 3 and the buffer 510 illustrated in block diagram in FIGURE 4.

As previously indicated the computer 508 provides both information and function input signals to the printer. The buffer 510 is provided between the computer 508 and the electronic portion 500 of the printer to permit use of the printer with the particular computer.

The computer 508 is conventional and includes a computer input-output buffer register 512, the memory system 550, instruction register 552, control system 554 and an arithmetic register 556 and suitable connections therebetween, as shown diagrammatically in the computer block diagram of FIGURE 3. The computer input and output buffer register 512 includes the computer printer select output conductors 514 and 516, the seven computer input conductors 518–524, the printer input request conductor 536, computer information ready conductor 538 and computer function ready conductor 540 connected thereto.

Since the computer 508 is conventional and forms no part of the present printer invention, it will not be considered in greater structural detail. However, the operation of the computer 508 will be considered briefly to indicate the connection of the printer of the invention thereto, through the buffer 510 and the related functioning thereof.

In operation the computer 508 may be connected through the computer input-output buffer register 512 to a number of different units, such as the printer of the invention, which units operate to program information to the computer or to receive computer outputs in the manner of the printer of the invention either directly or through a buffer, such as 510. Therefore, a signal is produced on the conductors 514 and 516 by the computer when the printer is selected for use with the computer.

Before the printer is selected, however, information which it is desired to print with the printer and printer function information are first programmed into the computer 508 over the computer input conductors 518–524 from a computer input unit, such as a magnetic tape reader (not shown). The computer 508 stores the input information it receives over conductors 518–524 in the memory system 550.

Subsequently the computer control system 554 under instructions from the instruction register 552 either on request from the printer over conductor 536 or independently due to programming operates on the stored input information in the arithmetic register 556 and feeds desired information and function signals to the printer through the buffer 510 from the computer input-output buffer register 512 over computer output conductors 542–548, computer information ready conductor 538 and computer function ready conductor 540.

The buffer 510, as previously indicated, performs the function of impedance matching and amplifying of signals passed directly between the printer and the computer 508. Additionally the buffer gates selected signals between computer 508 and the printer to insure their possible presence only during periods when the printer has been selected for operation with the computer. The buffer also provides a strobe signal to inhibit operation of the printer after information signals have been fed thereto until the information signals are stable. Further the buffer 510 functions to prevent resetting of the printer input flip-flops before the computer information is stabilized thereon and has been used.

Thus the buffer 510 includes the printer input request line impedance matching pad and amplifier 558 positioned between the printer input request conductor 560 from the printer read out enable circuit 668 and the printer input request conductor 536 to the computer 508. Similarly, the computer output lines impedance matching pads, amplifiers and inhibit gates 562 are provided in the buffer between the computer output conductors 542–548 and the printer input conductors 564–570, and the printer code disk character generator output circuit, impedance matching pads, amplifiers and inhibit gates are provided in the buffer 510 between the output conductors 586–592 from the print drum character generator photodiode system 272 of the printer and the input conductors 518–524 of the computer 508.

Gating of the computer output to the printer over computer output conductors 542–548, the printer paper advance gate system 596, the printer input flip-flop reset generator 598 and the print drum character generator photodiode system output over conductors 586–592 is accomplished through the printer select gate circuit 600 in conjunction with the computer printer select line amplifiers and impedance matching pads 602 which receive signals from the computer 508 over the conductors 514 and 516 which determines selection of the printer for use with the computer.

Computer information ready signals from the computer 508 on the output conductor 538 are fed through the computer information output synchronizing circuit 604, containing pulse forming, amplifying and impedance matching portions, to the print strobe generator 606 over conductor 608 which also includes pulse forming circuits and delay networks so that the signal delivered to the computer input decoding system 610 of the line printer over the conductor 612 is of the proper magnitude and shape. The signal provided on conductor 612 permits use of the signal inputs to the computer input decoding system 610 over conductors 564–570 only after the signal inputs thereto are stable.

The printer paper advance gate system 596 as previously indicated is provided with a gate signal from printer select gate system 600 over conductor 614. The printer paper advance gate system 596 is further provided with a paper advance signal from the computer 508 over conductor 564 and conductor 616. When the gate signal and paper advance signal are present on conductors 614 and 616 a paper advance command signal on output conductor 618 of the buffer 610 is provided from the printer paper advance gate system 596 on receipt of a computer function ready signal from the computer 508 on conductor 620 from the computer function output synchronizing circuit 622 which includes amplifying and impedance matching portions.

The printer input flip-flop reset generator 598 provides a reset signal on conductor 624 for the printer input flip-flops of the computer input decoding system 610 after each piece of information from the computer, whether it be computer function as a paper advance command or information to be printed, has been utilized by the line printer. A reset signal is provided on conductor 624 when a signal from the computer information output synchronizing circuit 604 over conductor 636 or a signal from the computer function output synchronizing circuit 622 over conductor 638 is present on the reception of a gate signal from the printer select gate circuit 600 over conductor 640. The reset signals are provided on the trailing edge of the signals from the computer information output synchronizing circuit 604 and the computer function output synchronizing circuit 622 so that the signals on the printer input flip-flops are stabilized and used before the flip-flops are reset.

The buffer 510 also forms no part of the present invention and will not therefore be considered in further detail. The buffer 510 like the computer 508 has been considered only to provide information as to the use made of the signals on the conductors 560 and 586–592 from the line printer and information as to the origin of signals on input conductors 564–570, 612, 624 and 618 to the line printer.

As shown in FIGURE 5 the hammer control system 502 includes the magnetic pickup unit 269, printer control timer 644, the type command generator and amplifier 646, and reset command generator and amplifier 648. The print control timer 644 in conjunction with the magnetic pickup 269 sequences the operation of the printer including the timing of read out enable signals and printer type and reset commands.

The hammer gate system 504 includes the computer input decoding system 610 and separate hammer gating circuits 656, best shown in FIGURE 7 for each of the 120 print hammers. In operation the hammer gate system receives information or function signals, and probe and reset signals from the computer 508 through buffer 510. The hammer gate system decodes the information or function signals to determine which printer hammers are to be actuated or which function is to be performed, prepares the hammer gating circuits associated with the indicated printer hammers for firing on recepion of a print command and after a print command resets the input decoding system 610 to receive additional information from the computer 508.

The paper motion spring clutch control system 506 comprises the start paper advance generator 658 including a start paper advance delay one-shot multivibrator 799 and a high power circuit 792 shown in FIGURE 8, paper skip channel select circuit 660, vertical format control photodiode system 375, paper vertical format control circuit 664 including a low power circuit 794 also shown in FIGURE 8, paper motion spring clutch assembly 128 and read out enable circuit 668. In operation, a signal is fed from the start paper advance generator 658 to the paper motion spring clutch assembly to energize the clutch and initiate paper advance motion. Signals from the computer input decoding system 610 and the vertical format control photodiode system 375 are then compared in the paper skip channel select circuit 660 to provide a control signal for the paper vertical format control circuit 664 to de-energize the paper motion spring clutch assembly 128 at the proper time to skip a predetermined number of lines during paper advance. The signals from the start paper advance generator 658 and the paper vertical format control circuit 664 are also used to actuate the read out enable circuit 668 to prevent the printer from requesting input information from the computer during paper advance.

*Hammer control system*

More specifically, the magnetic pickup unit 269 of the hammer control system 502 shown in FIGURE 6 is positioned adjacent the timing disk 265 which as previously indicated is mounted on the shaft of cam 108, for rotation therewith. Magnetic pickup probes are known and consist of an electric coil 702 surrounding a magnetic core 704. The reluctance of the magnetic circuit of the magnetic core is varied each time a magnetic member in the periphery of the timing disk passes the core 704 to provide a pulse of electrical energy in the coil 702.

The speed of the timing disk is such that every 6.25 milliseconds an electric impulse is generated in coil 702 which is fed to the delay multivibrator 706. Multivibrator 706 provides an output from the true (T) side thereof to the prime (P) side of the type command control flip-flop 708 and to the reset power amplifier 710 through inverter 712 for one-half of a millisecond. Zero power output from the true side of the type command control flip-flop 708 and from reset power amplifier 710 is provided at this time so that power is removed from the collector of all thyristors 650 previously turned on due to signals from the computer input decoding system 610. All thyristors 650 are thus turned off or rendered non-conducting.

At the end of the one-half millisecond reset signal the one-shot multivibrator 706 is triggered by a signal on conductor 716 from the one-half millisecond integral delay 718 to the prime side thereof to provide an output signal from the prime side thereof on the conductor 720 to the true side of the read out enable one-shot multivibrator 722. During the next two milliseconds the read out enable one-shot multivibrator 722 produces a printer input request signal on the conductor 560 to indicate to the computer 508 that the printer desires information during this two milliseconds.

As previously indicated during this two milliseconds the computer interrogates an entire bin of its memory system to find all characters in a complete line of 120 characters which the printer inicates to the computer 508 that it is capable of printing at this time. The particular character to be printed during a complete 6.25 millisecond cycle will of course depend on the position of the printer print drum 109.

Also, during this two milliseconds the hammer gate system 504 is operable to provide turn on signals for the thyristors 650 associated with the pulse coils 229 at the hammer positions, of the possible 120 positions on a printed line, indicated by the computer as being the addresses of characters the printer is capable of printing, to prepare the particular thyristors 650 for heavy conduction through the pulse coils 229 in response to a type command signal.

After the two millisecond portion of a 6.25 millisecond cycle of the printer, the read out enable one-shot multivibrator 722 is pulsed on the prime side thereof by a signal on conductor 736 to turn off the read out enable signal to the computer over the conductor 560 and to pulse the type command control flip-flop 708 on the true side thereof over the conductor 738. An output from the type command power amplifier 714 over the conductor 740 is thus provided causing heavy current conduction through the pulse coils 229 of all transistors 650 which were previously turned on during the two millisecond input request time.

As previously indicated the coils 229 when energized counteract the magnetic effect of the coils 228 one of which is associated with each of the coils 229 which coils 228 are energized by a constant voltage over conductor 744. Thus the beaver tails 182 of the printer hammers associated with the thyristors 650 which have previously been turned on are permitted to drop into the path of the cam whereby printing of all similar characters at predetermined addresses on a line is accomplished by the printer.

The energizing of the coils 229 and the printing of the characters at the indicated addresses is accomplished during the remaining 3.75 milliseconds of a 6.25 millisecond printer cycle. Thus as the magnetic pickup unit 269 senses the next magnetic element in the timing disk 265 corresponding to the next lobe of the cam a second pulse is applied to the delay reset bus control one-shot multivibrator 706 to again produce a one-half millisecond reset signal and the cycle is repeated to print the next character on the print drum 109.

*Hammer gate system*

The hammer gate system 504 illustrated best in FIGURE 7 comprises seven printer input flip-flops 746–752 and a strobe signal trigger, or print command circuit 754. Eight four input AND gates, only two of which, 756 and 758, are shown, are connected to the strobe trigger circuit 754 and to the flip-flops 746–748. Similarly, fifteen four input OR gates, only two of which, 760 and 762, are shown, are connected to the flip-flops 749–752.

The AND and OR gates combined in a double level gating system illustrated diagrammatically in FIGURE 7 define 120 unique conditions representing each of the 120 character addresses or positions on a line of the printer. The output from a different pair of AND and OR gates, for example AND gate 756 and OR gate 760 as shown are connected to the base circuit of each of the 120 thyristors 650 provided in conjunction with hammers 1–120 to permit turning on of the thyristors individually at desired times as previously indicated.

More specifically the seven flip-flops 746–752 receive signals from the computer 508 over buffer output lines 564–570 on their true side. The input to the prime side of the input flip-flops 746–752 is connected to the printer input flip-flop reset generator 598 over conductor 618 from the buffer 510.

Thus in operation during the two millisecond period when a printer read out enable signal is sent to the computer 508 from the print control timer 644, coded signals from the computer representing all the addresses of a particular character on a single line to be printed, which the line printer is capable of printing during the particular 6.25 millisecond cycle of operation are serially fed to the printer input flip-flops 746–752. A single set of signals arrives at the printer input flip-flops on investigation of each position in a single bin of the memory system of the computer 508 as previously indicated.

In between the separate sets of signals received from the computer the printer input flip-flops are reset by means of a signal reset signal fed to the prime side thereof over line 618 from the buffer 510. As previously indicated the strobe input signal from printer strobe generator 606 to print command circuit 754 over conductor 764 is fed to the line printer after each set of input signals are fed thereto over conductors 564–570 and after the input flip-flops 746–752 have become stable.

Each of the eight AND gates have four inputs thereto, as shown in FIGURE 34. Three of the inputs to the eight AND gates are from the printer input flip-flops 746–748. The other input signal to each of the eight AND gates is from the print command circuit 754. The printer logic is such that when the AND gates receive a signal from each of the four inputs thereto simultaneously the output of the AND gate is a positive ten volts. When any of the inputs to the AND gates is not present the output therefrom is zero volts.

Each of the OR gates similarly has four input signals thereto. The input signals to the OR gates are provided by the printer input flip-flops 749–752. Computer logic is such that when any of the inputs to an OR gate is present the output therefrom is a positive ten volts. When there is no input signal on any of the input lines to an OR gate the output signal therefrom is zero volts.

Thus it can be seen that by connecting each of the eight AND gates to a thyristor input conductor 766 of fifteen of the 120 thyristors 650 and by connecting the output of each of the OR gates to the thyristor input conductor 768 of eight of the 120 thyristors 650 that 120 unique signals present at the printer input flip-flops 746–752 will provide an input to separate ones of the 120 thyristors 650 of ten volts over the input conductors 766 and zero volts over the input conductors 768 which is a necessary condition for turning on the thyristors 650 during the two milliseconds in each 6.25 millisecond cycle of the printer during which printer input request or read out enable signals are sent to the computer 508.

Each thyristor 650 is coupled to the outputs of the separate gates such as AND gate 756 and OR gate 760 as indicated in FIGURE 7 through a resistor 770 and capacitor 772 which operate in conjunction with the diode 774 and resistor 786 to provide a turn-on signal at the base of the thyristors 650.

Thus considering the operation of a particular thyristor 650, when the signal input to the printer input flip-flops 746–752 are such that a signal is provided on all four conductors to the AND gate 756 and no signals are present on the conductors to the OR gate 760 the capacitor 772 will be charged through resistor 770 due to the ten volt potential difference thereacross. The strobe signal applied through the print command circuit 754 is then removed from the AND gate 756 after the input flip-flops 746–752 are in a stable state. The voltage at AND gate 756 will therefore drop to zero volts and therefore the voltage at the thyristor goes negative causing the capacitor 772 to discharge through the diode 774 and thyristor 650 sufficient to turn on the thyristor so that during the previously indicated subsequent 3.75 millisecond printer type command the thyristor 650 will conduct heavily through the pulse coil 229 associated therewith to cause printing of the character at the particular hammer address indicated by the signal on printer input flip-flops 746–752.

The thyristor switching circuit as explained above has the advantage over a normal two transistor flip-flop of requiring less circuit components. Further the turn-on time requirements of the pulse coil energizing circuit and the turn-on current are relatively critical in the printer and the thyristor switching circuit explained above meets these requirements.

Thus, in the printer the minimum time between character sensing as governed by the logic speed of the driving computer will be seven microseconds while the maximum switch time of the thyristor is .15 microsecond. This time differential between time available and time used in thyristor turn-on permits the use of a capacitor coupled thyristor input as described above wherein the input capacitor 772 is slowly charged during the two millisecond hammer selection portion of the 6.25 millisecond printer cycle and rapidly discharged at the end of the cycle if the thyristor associated therewith is turned on.

Further, with the thyristor hammer gate circuit, capacitive thyristor input and the double level gating described above, the power requirements of the printer of the invention are kept to a minimum so that maximum drive current required from any OR gate is the current necessary to charge eight 130 picofarad twenty kilo-ohm networks in six microseconds and the maximum current required from any AND gate is the sum of the current necessary to turn on one thyristor and the discharge current from fourteen thyristor resistance capacitance input networks. The net result is a system of 120 medium current (450 milli-amperes) pulse coils which may be actuated through a low level (25 milli-amperes) gating system by high speed (one megacycle) low level (5 milli-amperes) inputs.

*Paper motion spring clutch control system*

The paper motion spring clutch control system 506, as best shown in FIGURE 8, is provided to advance paper through the printer in response to paper advance signals from the buffer 510 over conductor 618. The number of lines skipped during paper advance by the printer is controlled by the vertical format control photodiode system 375 previously considered, in conjunction with the computer 508. It will be understood that although the number of lines skipped is, in the present discussion, determined jointly by the vertical format control photodiode system 375 and the computer 508, complete control of the vertical format of the printer can be programmed into the printer.

The paper motion spring clutch control system 506 as previously indicated comprises a high power circuit 792 which initiates actuation of the clutch device 128, and a low power circuit 794 which sustains actuation of the clutch. A printer input request inhibit circuit 686, a stop paper advance circuit 798 and a start paper advance delay one-shot multivibrator 799 are also included in the system 506.

In the stop paper advance circuit 798 signals are received by the paper skip channel select circuit 660 over conductors 688–695 from the vertical format control photodiode system 375 and from the computer input decoding system 610 over conductors 681–688. On a preselected combination of the received signals the paper skip channel select circuit 660 provides an output signal on conductor 790 to cause disengagement of the clutch 128 as will later become obvious.

The high power separate clutch actuating circuit 792 includes the start paper advance one-shot multivibrator 800 and the high power paper drive amplifier 802 for energizing the power transistor 804 to cause a high current to be conducted through the paper motion spring clutch solenoid 414. The low power clutch actuating circuit 794 includes the paper drive format control flip-flop 808 and the low power paper drive amplifier 810 for energizing the power transistor 812 to cause current to be conducted through resistor 814 and the paper motion clutch solenoid 414 after transistor 804 is turned off. The printer input request inhibit circuit 686 includes the OR gate 816 and the printer input request inhibit one-shot multivibrator 818. It will be noted that the multivibrators 799, 800 and 818 include time delay circuits 820, 822, and 824, respectively, integrally associated therewith.

In operation the paper motion spring clutch control system 506 receives a start paper advance input signal from computer 508 over the conductor 618 from the buffer 510 after a line has been printed. The true side of the start paper advance delay multivibrator 799 is triggered by the signal from computer 508 and provides an output signal on conductor 827 to trigger the true side of multivibrator 808. Multivibrator 800 is triggered on the true side by a signal from the true side of multivibrator 799 after a time delay of for example five milliseconds which is sufficient to permit the mechanical portions of the printer to reach a static condition and prevent tearing of the printing paper. The time delay is diagrammatically indicated as delay 801.

In the high power circuit 792 for actuating the clutch solenoid 414 the output of the multivibrator 799 on conductor 826 is fed to the true side of the start paper advance multivibrator 800 to produce an output on conductor 834 which when amplified through the high power paper drive amplifier 802 will cause high conduction of the power transistor 804 to cause a high current to pass through the paper motion spring clutch solenoid 414. The input to the amplifier 802 over conductor 834 is maintained for a period determined by the delay 822 which is an integral part of multivibrator 800 after which it is stopped due to an input to the prime side of multivibrator 800.

Thus the major function of the high power clutch actuating circuit 792 is to provide a high current impulse through the paper motion spring clutch solenoid 414 for a relatively short period after the reception of a start paper advance command fed thereto through delay 801. This high current signal through solenoid 414 overdrives the solenoid 414 for a very short time whereby the initial engagement of the spring clutch is extremely rapid to facilitate the starting of the paper advance rapidly. The high power signal through solenoid 414 is sufficient to advance the printer paper no more than one vertical space.

High power is not required to maintain the spring clutch 128 engaged during multiple space skipping. Therefore, if multiple space paper advance is indicated by the signal on conductor 790 from the paper skip channel select circuit 660, the solenoid 414 is energized by current passed through transistor 812 in the low power actuating circuit 794 after transistor 804 is turned off due to the signal received at the transistor 812 through the amplifier 810 from flip-flop 808 which produces an output on conductor 830 in response to a signal from the true side of multivibrator 799.

The spring clutch will be energized through transistor 812 after transistor 804 is turned off until a stop paper advance signal is sent to the low power clutch actuating circuit 794 over the conductor 790 to the prime side of the flip-flop 808. At this time the transistor 812 is caused to stop conducting and the clutch becomes disengaged to stop paper advance.

The printer input request inhibit circuit 686 as previously indicated includes the OR gate 816 which receives signals over conductor 825 from the multivibrator 799, from conductor 834 in the high power circuit 792 and from conductor 830 in the low power circuit 794. Thus a signal output is provided on conductor 848 from the OR gate 816 at the time the paper advance signal is received over conductor 618.

Conductor 848 supplies a signal input to the true side of the printer input request inhibit one-shot multivibrator 818 whereby a signal is provided on conductor 850 which is operable to prevent a read out enable signal from the printer from being sent to the computer 508 during the period of paper advance. Further, the inhibit signal on conductor 850 is maintained for a period determined by the delay 824 after the output on conductor 848 indicates stopping of paper advance to permit sufficient time for the paper drive mechanism and paper to come to a complete stop. Time delay 824 is integral with the multivibrator 818.

Thus it can be seen that with the paper motion spring clutch control system 506 the line printer paper may be advanced a predetermined number of spaces with a minimum of required power due to the fact that the heavy current necessary to actuate the spring clutch quickly is not needed or used to maintain the spring clutch actuated. Further an inhibit signal is provided to prevent printing by the line printer during paper advance and for a predetermined time before and after actual paper advance which will allow the mechanical components and printer paper to come to a static condition regardless of the number of spaces skipped.

*Power supply portion*

Figure 10:
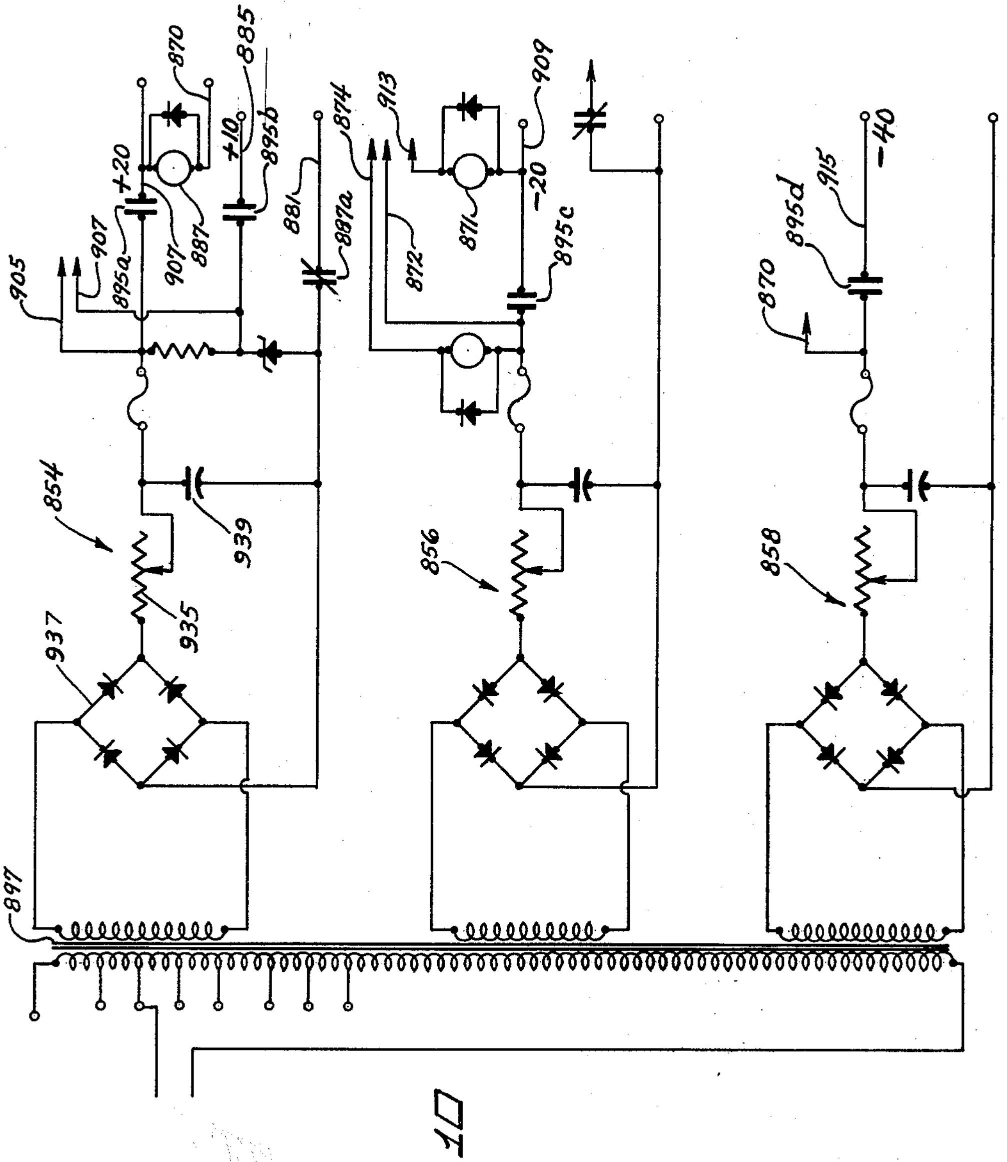

The printer power supply illustrated in FIGURES 9 and 10 operates from a line voltage of 95–125 volts, 60 cps., and requires 7 amperes. All electrically operated components of the printer receive their power from the power supply. Five regulated voltages are generated: +10, +20, −20, and −40 volts, direct current and 11 volts alternating current. An unregulated voltage, nominally −20 volts, direct current, is also generated for use in energizing the hammer magnet hold coils and paper advance spring clutch solenoid 806.

The power supply includes the control circuit 852 and the separate circuits 854, 856, 858 and 860 including constant voltage transformers for producing the indicated regulated and unregulated voltages. A voltage sensing circuit 862, and hammer cycle and unregulated voltage check circuits 864 and 866 respectively illustrated in FIGURES 11, 12 and 13 respectively are also included in the power supply.

Additionally the power supply includes means for generating a printer ready signal and a clear signal. The printer ready signal is fed to the computer to indicate to the computer that the printer is ready for operation. The clear signal is fed to printer elements which require a specific state of operation before the printer will function correctly to insure such state of operation before the printer is cycled.

The control circuit 852, the power supply circuits 854, 856, 858 and 860, voltage sensing circuit 862, and hammer cycle and unregulated voltage check circuits 864 and 866 are so related as to prevent extensive damage to the printer should component breakdown occur during printer continuous run procedure and to divide the load on the power circuits during printer turn-on procedure. In this latter connection the power supply is sequenced to first provide energy to prepare the hammers for operation as considered in connection with the bail bar, subsequently energize the power supplies and then start the printer drive motor.

*Control circuit*

Referring to FIGURE 9 the control circuit 852 will be considered in conjunction with the turn-on procedure of the printer.

Voltage is applied to relay 853 when the power-on switch 246 is held closed, provided drum-arm-down interlock switch 347 and drum-arm-clamped interlock switch 349 are both closed. Latch position switch 247 is open at this time since the bail bar is in the non-print position and the latch 256 is down on cam 249 as shown in FIGURE 14. Closure of relay contacts 853*a* applies voltage to latch solenoid 248 through the power-on switch, to bail bar solenoid 245 through the normally closed contacts 871*a* of relay 871 shown in FIGURE 10, and to transformers 873 and 875.

As previously indicated, application of voltage to the bail bar solenoid 245 rotates the bail bar so that it presses the armatures 227 of the spring biased levers 215 of the interposer systems against the pole piece 227 of the electromagnets 226 associated therewith. At the same time the sidewise force which the bail bar had been exerting on the latch 256 is removed. The latch 256 is thus lifted by its solenoid 248 to free the bail bar for rotation to the print position upon the removal of voltage from its solenoid 245.

Figure 12:
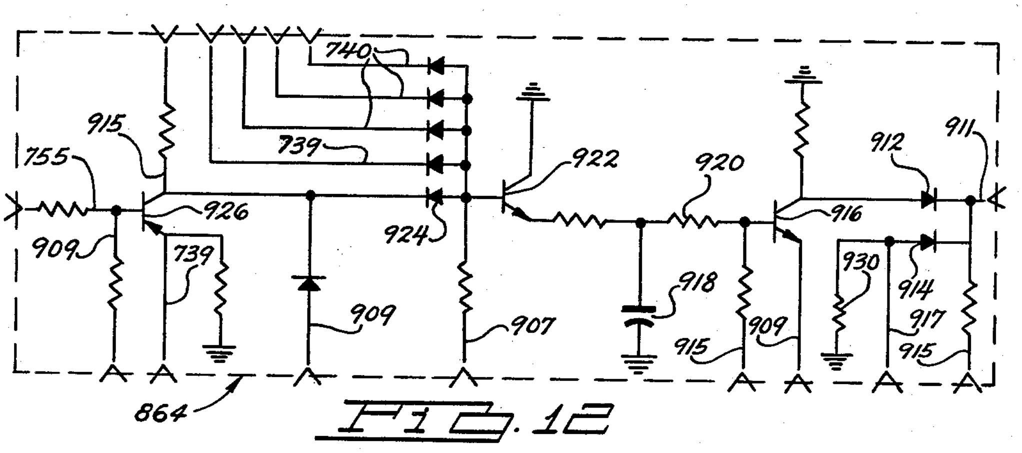
Figures 11, 13:
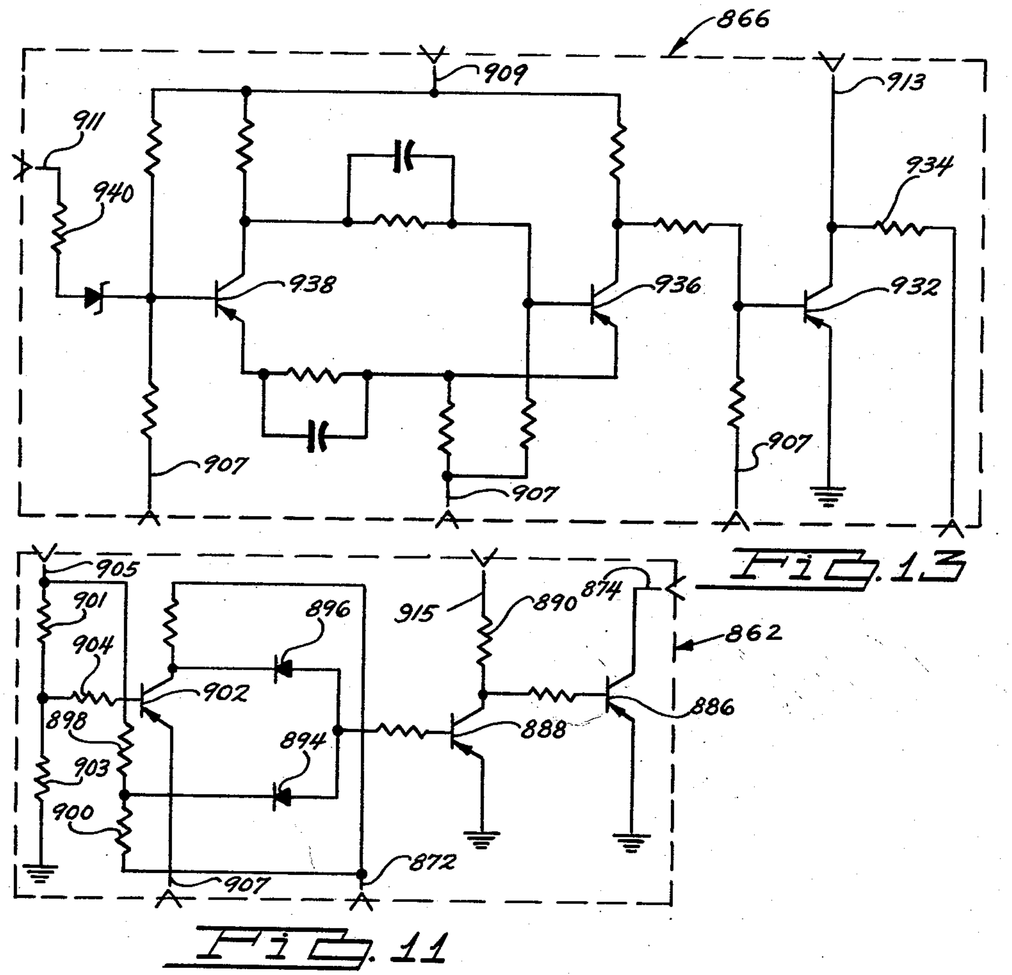

When all regulated voltages are present, the voltage sensing circuit illustrated in FIGURE 11 permits operation of relay 895 illustrated in FIGURE 10 connected thereto by conductor 874. Operation of relay 895 closes the relay contacts 895*a*, 895*b*, 895*c* and 895*d* to distribute the regulated direct current +20, +10, −20 and −40 voltages respectively over conductors 907, 885, 909 and 915 respectively. When the unregulated direct current voltage applied to the printer holding coils reaches a level which will hold the spring biased levers 215 in the non-print position, and provided no print commands are being received over print command bus 740 as determined by the hammer cycle check circuit 864 illustrated in FIGURE 12, the unregulated voltage check circuit 866 illustrated in FIGURE 13 permits energization of relay 871 shown in FIGURE 10 over conductor 913.

Energization of relay 871 closes relay contacts 871*b* (FIGURE 9) and starts the main drive motor 107, ribbon motor 351 and printer blower motor 883. Operation of relay 871 also opens relay contacts 871*a* to remove voltage from the bail bar solenoid 245 so that the bail bar 243 under spring urging rotates past the latch 256 to the print position. The power-on switch 246 may now be released, since the latch 256 can no longer restrain the bail bar 243, the lifted position of the latch armature operates latch position switch 247 to bypass switches 246, 347 and 349 and maintain current through relay 853.

When the bail bar reaches the print position, it operates printer ready switch 246. The output conductor 868 is connected to ground through the printer ready switch 246 to complete an electric circuit therethrough and conveys a "printer ready" signal to operate an indicator light on the computer 508. The other output conductor 870 applies voltage to time delay relay 887. The time delay relay is energized after a delay which allows the main drive motor 107 to reach full speed before removing the clear signal which has been sent to the printer electronic elements requiring a specific operating state before printer cycling is started. Removal of the clear signal permits normal cycling of the reset and print pulses and thereby subjects these pulses to subsequent check by the hammer cycle check circuit 864. The removal of the clear signal also allows data input to the printer by permitting "read out enable" signal over conductor 560 from the electronic portion 500 of the printer to the computer 508 to become true, which controls when the computer can feed information to the printer.

Printer shutdown may be initiated in one of three ways, closure of power-off switch 889, closure of drum-arm-clamped interlock switch 349 or removal of voltage from relay 871 to energize bail bar solenoid 245. Voltage is removed from relay 871 upon the occurrence of low hammer holding coil voltage or improper hammer cycling, as detected by the unregulated voltage check circuit 866 or hammer cycle check circuit 884.

The application of voltage to bail bar solenoid 245 causes the bail bar to rotate to the non-print position as shown in FIGURE 14. Upon leaving the print position, the bail bar cam 249 opens printer ready switch 246. The conductor 868 consequently conveys the status "printer not ready" to the indicator on computer 508. The other conductor 870 associated with the printer ready switch 246 removes voltage from the time delay relay 887 and applies a clear signal to the printer flip-flops. When the bail bar reaches the non-print position, the latch 256, under spring urging, drops down to restrain the bail bar when voltage is removed from the bail bar solenoid 245. Latch position switch 247 is opened when the latch armature is fully down, removing voltage from relay 853, thus removing power from the printer.

*Voltage producing and sensing circuits*

With regard to the regulated voltage producing circuits 854, 856 and 858, the output of constant voltage transformer 875 applies 118 volts to the input of regulated voltage transformer 897 and photodiode lamp transformer 899. Transformer 899 applies 11 volts to the photodiode lamps. Rheostats 935 are placed between the full-wave recitifiers 937 and filter capacitor 939 of each voltage producing circuit 854, 856 and 858 for the purpose of adjusting the magnitude of the output voltage, if required.

Unregulated voltage transformer 873 of circuit 860 charges capacitor 942 to a nominal −20 volts. With variations in line voltage and loading, the voltage may range between −16 volts and −25 volts. The unregulated voltage is used to drive the pulse and holding coils 229 and 228 and the paper advance solenoid. The steady voltage applied to the holding coils 228 is reduced by the drop across rheostat 893, and ranges between −12 volts and −19.5 volts. Steady holding coil current ranges between 4 amperes and 5.5 amperes.

The voltage sensing circuit of FIGURE 11 energizes relay 895 by grounding the relay through conductor 874 when all regulated voltages are present. Contacts **895*a*, 895*b*, 895*c*, and 895*d* are closed on energization of relay 895** to distribute the regulated direct current voltages.

Operation of relay 895 requires the presence of ground on the conductor 874 and −20 volts direct current on conductor 872, which checks the −20 volt voltage. Ground is obtained when transistor 886 is turned on, which requires that transistor 888 be turned off and −40 volts be applied to resistor 890 through conductor 870, which checks the −40 volts. Transistor 888 will turned off if it does not receive base drive through either of the input diodes 894 or 896. Diode 894 connectes to a voltage divider including resistors 898 and 900 and turns on transistor 888 if +20 volts is not present on conductor 905, which checks this voltage. Diode 896 will conduct current to turn on transistor 888 unless transistor 902 is turned on. Transistor 902 is turned on if the +10 volts on conductor 907 exceeds the voltage between resistors 901 and 903 and causes resistor 904 to carry enough current to cause the collector of transistor 902 to become positive, which checks the +10 volts.

Thus it will be apparent that if any of the regulated voltages are not present or are not of proper magnitude that relay 895 will not be energized. Consequently the regulated voltages will not be applied to the printer and the printer will not operate unless the voltages are all present at the proper magnitude.

*Hammer cycle and unregulated voltage check circuit*

The hammer cycle check circuit 864 of FIGURE 12 will shut down the printer if hammers are being improperly cycled due to a constant print command on any of the plurality of parallel printer type command busses 740, or a constant printer information request or read out enable signal on conductor 560 or if no reset signal is produced on reset buss 739 which conditions could seriously damage the printer if printer power were supplied while they continued to exist.

The printer is shut down under these conditions by generating, from the hammer cycle check circuit 864, a voltage which causes the unregulated voltage check circuit 866 to remove voltage from relay 871 connected to the voltage check circut 866 over conductor 913. The unregulated voltage check circuit 866 responds to a voltage of predetrtmined magnitude which voltage is determined by the magnitude of the unregulated voltage or the output of the hammer cycle check circuit. The unregulated voltage is fed to the hammer cycle check circuit over the conductor 917 and is gated at diode 914. The signal of the hammer cycle check circuit is gated at diode 912. The signal from the gate diodes 912 and 914 are fed over conductor 911 to circuit 866.

The hammer cycle check circuit will generate a voltage which when gated at diode 912 will shut down the printer if transistor 916 is turned off. Transistor 916 is turned on due to the current through resistor 920 which is regulated by the capacitor 918. Unless capacitor 918 is periodically discharged by conduction of transistor 922, it will become fully charged and transistor 916 will turn off. Capacitor 918 will be normally discharged during each reset time due to the reset signal fed to the hammer cycle check circuit over conductor 739. The time constant of resistor 920 and capacitor 918 is made long enough so that transistor 916 will remain steadily on if capacitor 918 is discharged during each reset time.

The condition for turning on trasistor 922 is that all inputs to the gate at its base be at ground. Logically, all inputs from the print command conductors 740 must be false, the reset signal over conductor 739 must be true, and to put the input to diode 924 at ground the strobe signal on conductor 755 must be false. A false strobe signal corresponds to ground and will turn on transistor 926, placing its collector at ground. A true strobe signal corresponds to +10 volts and will turn off transistor 926, clamping its collector to −20 volts.

The unregulated voltage check circuit 910 will shut down the printer if the unregulated voltage falls too low. The printer is shut down by removing voltage from relay 871 in FIGURE 10.

The unregulated voltage, which is nominally −20 volts, is gated with the output of the hammer cycle check circuit 864, at diodes 912 and 914. Resistor 930 provides a path to low voltage if the unregulated voltage is not connected to circuit 864 over conductor 917.

Voltage is removed from relay 871 by turning off transistor 932. Upon turning off, the collector voltage of transistor 932 is coupled through resistor 934 to cause "read out enable" to immediately become false. Transistor 932 is turned off by conduction of transistor 936.

Transistors 936 and 938 form a Schmitt trigger. Transistor 938 turns off and transistor 936 turns on, when the voltage input to resistor 940 falls (in the absolute sense) to −16 volts. The state of the Schmitt trigger is reversed when the voltage rises (again, the absolute sense) to −18 volts.

Thus it will be readily apparent that the hammer cycle and unregulated voltage check circuits function in combination to shut down the printer automatically if the printer cycle is not correct due to a constant print command on buses 740, a constant strobe signal or print command on conductor 755 or no reset signal on conductor 739 or to shut down the printer if the unregulated voltage falls to a level below that required to maintain the levers 215 in a non-print position. The hammer cycle and unregulated voltage check circuits also are seen to stop read out of computer information under the same cycle and unregulated voltage conditions. Therefore both serious damage to the printer and loss of information from the computer are prevented by the hammer cycle and unregulated voltage check circuit in combination which would otherwise occur on improper printer cycling or voltage level occurring.

What we claim as our invention is:

1. In a printer for typing lines of information in response to received signals including a separate printer hammer at each character address in a line of type, a hammer gating system comprising a separate electronic circuit associated with each printer hammer including a grounded emitter semi-conductor device which is operable on being turned on to cause actuation of the hammer associated therewith on reception of a type command by the circuit, means for receiving signals defining particular character addresses in a line of type, and means operable between the signal receiving means and said circuits for selecting and turning on the semi-conductor devices at the character addresses defined by the received signals.

2. Structure as set forth in claim 1 wherein said receiving and selecting means are operable to serially turn on said separate circuits at the defined character addresses, and means to subsequently cause parallel actuation of the hammers associated with the turned on circuits.

3. Structure as set forth in claim 1 wherein the means for receiving the signals defining particular character addresses comprises a plurality of signal input flip-flops, and the means for selecting and turning on the semi-conductor devices at the defined character addresses comprises a double level gating circuit connected to the input flip-flops.

4. Structure as set forth in claim 3 wherein there are seven signal input flip-flops which uniquely define 120 character addresses.

5. In a printer for typing lines of information in response to received signals including a separate printer hammer at each character address in a line of type, a hammer gating system comprising a separate electronic circuit associated with each printer hammer operable on being turned on to cause actuation of the hammer associated therewith on reception of a type command, means for receiving signals defining particular character addresses in a line of type including seven signal input flip-flops which uniquely define one hundred twenty character addresses and means operable between the signal receiving means and said circuits for selecting and turning on the circuits defined by the received signals including a double level gating circuit comprising eight AND gates and fifteen OR gates each including output conductors and means connecting the output conductor of each of the eight AND gates to the output conductor of each of the fifteen OR gates to provide one hundred twenty separate AND and OR gate combinations and means for connecting each of the separate AND and OR gate combinations to a different one of said separate circuits.

6. In a printer for typing lines of information in response to received signals including a printer hammer, a hammer gating system comprising an electronic circuit associated with the printer hammer including a semi-conductor device operable on being turned on to cause actuation of the hammer on reception of a type command by the circuit, means for receiving a signal defining a particular character address in a line of type, and means operable between the signal receiving means and said circuit for turning on the semi-conductor device.

7. Structure as set forth in claim 5 wherein each AND and OR gate have four input conductors, the input conductors of each of the OR gates are connected to the output conductors of four of the input flip-flops, three of the input conductors of each of the AND gates are connected to the output conductors of the other three input flip-flops, and a print command generator is provided for preventing turning on of the separate circuits until the signals received by the input flip-flops are stable having an output conductor connected to the fourth input conductor of each of the AND gates.

8. Structure as set forth in claim 5 wherein each of the separate electronic circuits comprises a thyristor having a grounded emitter, and means connecting the base of each thyristor to a different one of said separate combinations of AND and OR gates.

9. Structure as set forth in claim 8 and further including a thyristor reset signal buss, means for producing a thyristor reset signal on said thyristor reset signal buss, and means connecting said thyristor reset signal buss to the collector of said thyristor.

10. Structure as set forth in claim 8 and further including a printer hammer pulse coil, a type command signal buss, means for producing a type command signal on said type command buss, and means connecting said type command buss to the collector of said thyristor through said pulse coil.

11. Structure as set forth in claim 8 wherein said means for connecting the base of each thyristor to a different one of said separate combinations of AND and OR circuits is a capacitive coupling.

12. Structure as set forth in claim 8 wherein said means for connecting the base of each thyristor to a different one of said separate combinations of AND and OR gates comprises a capacitor and resistor in series between the AND gate and OR gate, a unidirectional conductor connected between the junction of the capacitor and resistor and the base of the thyristor, and a source of power connected between the diode and the base of the thyristor.

13. In a printer for typing lines of information in response to received signals including a separate printer hammer at each character address in a line of type, a hammer gating system comprising a separate electronic circuit associated with each printer hammer including a grounded emitter semi-conductor device which is operable upon being turned on to cause actuation of the hammer associated therewith on reception of the type command by the circuit, means for receiving signals defining particular character addresses in a line of type, means operable between the signal receiving means and said circuits for selecting and turning on the semi-conductor devices at the character addresses defined by the received signals, and means for delaying the turning on of the semi-conductor devices at the defined addresses until the signals received have become stable.

14. In a printer for typing lines of information in response to received signals including a separate printer hammer at each character address in a line of type, a hammer gating system comprising a separate electronic circuit associated with each printer hammer including a grounded emitter semi-conductor device which is operable upon being turned on to cause actuation of the hammer associated therewith on reception of a type command by the circuit, means for receiving signals defining particular character addresses in a line of type, means operable between the signal receiving means and said circuits for selecting and turning on the semi-conductor devices at the character addresses defined by the received signals, and means for periodically providing the separate circuits with a type command signal.

15. In a printer for typing lines of information in response to received signals including a separate printer hammer at each character address in a line of type, a hammer gating system comprising a separate electronic circuit associated with each printer hammer including a grounded emitter semi-conductor device which is operable upon being turned on to cause actuation of the hammer associated therewith on reception of a type command by the circuit, means for receiving signals defining particular character addresses in a line of type, means operable between the signal receiving means and said circuits for selecting and turning on the semi-conductor devices at the character addresses defined by the received signals, and means for periodically providing the separate circuits with a simultaneous type command signal.

16. In a printer for typing lines of information in response to received signals including a separate printer hammer at each character address in a line of type, a hammer gating system comprising a separate electronic circuit associated with each printer hammer including a grounded emitter semi-conductor device which is operable upon being turned on to cause actuation of the hammer associated therewith on reception of a type command by the circuit, means for receiving signals defining particular character addresses in a line of type, means operable between the signal receiving means and said circuits for selecting and turning on the semi-conductor devices at the character addresses defined by the received signals, and means for periodically providing the separate circuits with a circuit reset signal operable to turn the circuits off.

17. In a printer for typing lines of information in response to received signals including a separate printer hammer at each character address in a line of type, a hammer gating system comprising a separate electronic circuit associated with each printer hammer including a grounded emitter semi-conductor device which is operable upon being turned on to cause actuation of the hammer associated therewith on reception of a type command by the circuit, means for receiving signals defining particular character addresses in a line of type, means operable between the signal receiving means and said circuits for selecting and turning on the semi-conductor devices at the character addresses defined by the received signals, and means for cyclically providing the separate circuits with simultaneous type command signals and simultaneous circuit reset signals.

18. A control circuit for printer hammers or similar devices comprising a reset signal buss, a device selecting signal buss and a function command signal buss, a thyristor, means connecting the device selecting signal buss to the base of the thyristor, means connecting the reset signal buss and the function command signal buss to the collector of the thyristor, said means connecting the function command signal buss to the collector of said thyristor including a coil and a unidirectional conductor in series therebetween, means for cyclically providing a reset signal on the reset signal buss and a function command signal on the function command signal buss, and means for selectively providing a device selecting signal on the device selecting signal buss between a reset and function command signal.

19. A control circuit for printer hammers or similar devices comprising a re-set signal buss, a device selecting signal buss and a function command signal buss, a thyristor, means connecting the device selecting signal buss to the base of the thyristor, said means comprising a capacitor and resistor in series, and a unidirectional conductor connected between the junction of the resistor and capacitor and the base of the thyristor, means connecting the reset signal buss and the function command signal buss to the collector of the thyristor, means for cyclically providing a reset signal on the reset signal buss and a function command signal on the function command signal buss, and means for selectively providing a device selecting signal on the device selecting signal buss between a reset and function command signal.

References Cited by the Examiner

UNITED STATES PATENTS

| | | | |
|---|---|---|---|
| 2,909,993 | 10/59 | Shafer et al. | 101—93 |
| 2,915,966 | 12/59 | Jacoby | 101—93 |
| 2,915,967 | 12/59 | Gehring et al. | 101—93 |
| 2,918,658 | 12/59 | Hoberg et al. | 101—93 X |
| 2,941,188 | 6/60 | Fletchner et al. | 101—93 X |
| 2,954,731 | 10/60 | Durand et al. | 101—93 |

OTHER REFERENCES

"Applications and Circuit Design Notes" (Solid State Products, Inc.) Figure 6, page 7.

WILLIAM B. PENN, *Primary Examiner.*